Oct. 20, 1959 R. B. DOME 2,909,593

SQUELCH-LIMITER CIRCUIT FOR COLOR TELEVISION

Filed May 6, 1953

Inventor:
Robert B. Dome,
by Charles M. Hutchins
His Attorney.

United States Patent Office 2,909,593
Patented Oct. 20, 1959

2,909,593

SQUELCH-LIMITER CIRCUIT FOR COLOR TELEVISION

Robert B. Dome, Geddes Township, Onondaga County, N.Y., assignor to General Electric Company, a corporation of New York Application May 6, 1953, Serial No. 353,292

5 Claims. (Cl. 178—5.4)

Figures 1, 2:
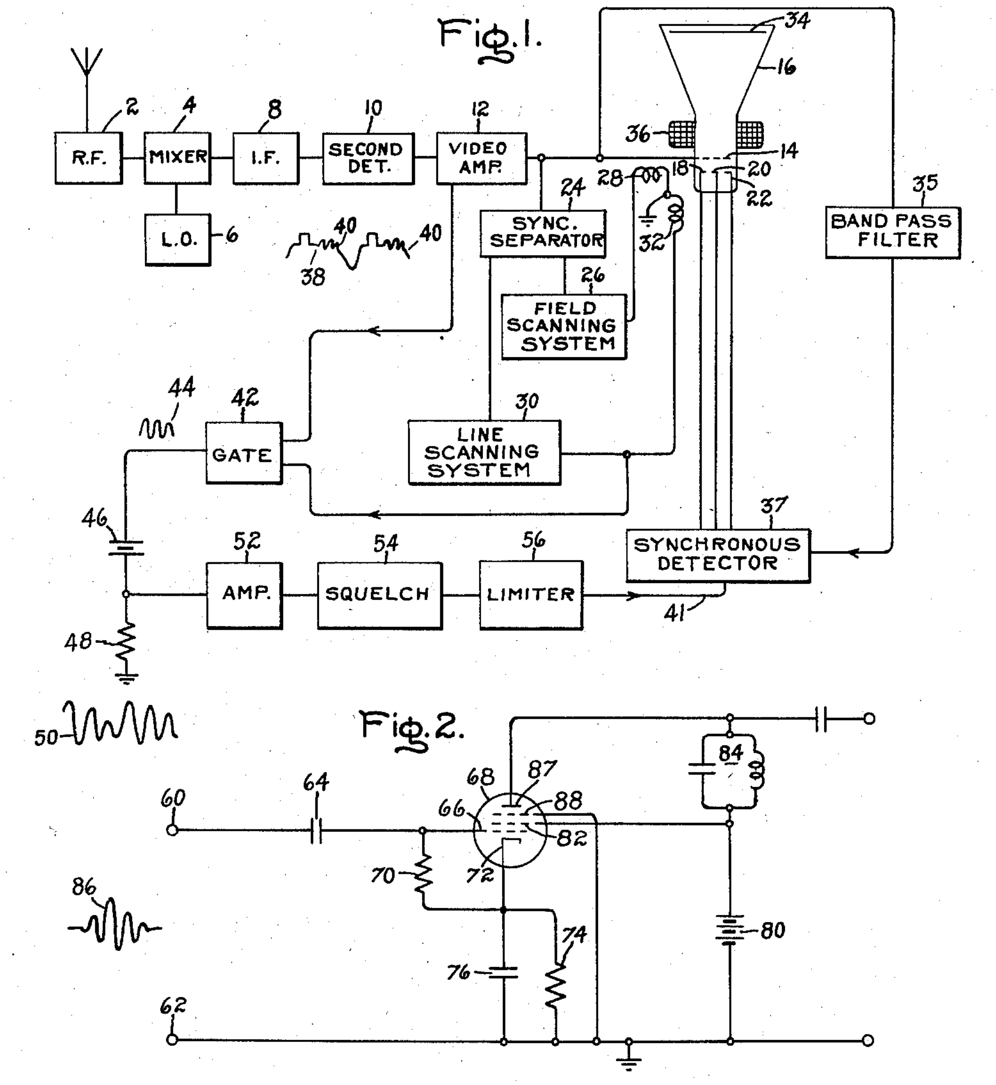

This invention relates to improvements in color television receivers, and particularly to improved limiting and squelch circuits having particular utility in such receivers.

A color television system has recently been proposed in which a color subcarrier having a phase indicative of hue and an amplitude indicative of the degree of color saturation or purity is added to the presently standardized signals for the transmission of brightness information. In order to conserve bandwidth, the color carrier and its sidebands occupy the same portion of the frequency spectrum as the upper frequencies of the brightness signal. In order to establish a reference with which the phase of the color carrier can be compared and the hue information determined, it has been proposed that a burst of a few cycles of a predetermined phase of a wave of the color carrier frequency be added during line blanking intervals of the standard black and white signal. At a color receiver means are provided for supplying a substantially continuous reference wave under the control of the few cycles of the reference phase. Various phases of the reference wave are heterodyned in a synchronous detector with the received color carrier and a portion of its sidebands so as to produce signals indicative of the various colors selected as the basis of the system.

In some previous receivers, the reference wave has been supplied to the synchronous detector by an oscillator. Therefore, when only brightness information is being transmitted, the output of the oscillator is heterodyned in the synchronous detector with the high frequency brightness signals so as to produce signals in the color control circuits of the receiver that are necessarily meaningless. Accordingly color disabling circuits have been provided. These circuits may operate to prevent the synchronous detector from deriving any signals or they may operate to prevent such signals from being applied to the image reproducing system. In either case the color disabling circuit does not aid directly in the recovery of the color signals but merely as a switch.

It is, therefore, an object of this invention to provide an improved color disabling circuit that aids directly in the recovery of the color signals.

This objective can be attained by using a source of the continuous reference wave that has a low energy output when the few cycles of the reference phase of the color carrier are not present in the composite signal, i.e. when only brightness information is received and by preventing any output from this source that lies below a predetermined amplitude level from reaching the synchronous detector. The latter function can be accomplished by using what is generally known as a squelch circuit. During color transmission when the continuous reference wave has a substantial energy level, the squelch circuit may serve as an amplifier.

Even though color signals are being transmitted, receivers on the fringe areas for one particular station may not be able to reproduce an acceptable color image because of the weak color signals, but they may be able to reproduce an acceptable black and white or brightness image. The level at which the squelch circuit passes the signals to the synchronous detector can be set so that the detector is inoperative when the color signals are too weak to produce an acceptable color image. The receiver will then produce a black and white image even though color signals are being received.

If the source of the continuous reference wave is such as to have a low energy output level when the bursts are not present, the amplitude of the reference wave supplied by such a source when the bursts are present generally decays during the line scanning intervals between the bursts. For the best operation of most synchronous detectors the reference wave applied to them should have a constant amplitude.

Therefore, in accordance with another object of this invention, means are provided for maintaining any reference wave provided by the squelch circuit at a predetermined amplitude.

This last objective can be achieved by using a limiter in conjunction with the squelch circuit.

It is another purpose of the invention to provide an inexpensive squelch and limiter circuit that uses only a single electron discharge device.

It is another object of this invention to provide an improved squelch-limited circuit that is immune to noise impulses when a desired signal is not applied to it.

A way of attaining these objectives will be better understood after the following detailed consideration of the drawings in which:

Figure 1 is a block diagram of a color television receiver constructed in accordance with the principles of this invention, and Figure 2 is a schematic diagram of a squelch and limiting circuit using a single electron discharge device.

The following description sets forth the components normally used in a color television receiver of the type in which the present invention is useful. Various changes may be made in the components without affecting the operation of the invention. The received signal is passed through a radio frequency amplifier 2 to a mixer 4 wherein it is heterodyned with the output of a local oscillator 6 so as to produce an intermediate frequency carrier which is passed through an I.F. strip 8. A second detector 10 is coupled to the output of the I.F. amplifier so as to recover the composite television signal. After the signal has been suitably amplified by a video amplifier 12 it is applied to an intensity control electrode 14 of a color image reproducing device which in this particular example is a cathode ray tube 16 in which the grid 14 controls the intensity of each of three beams of electrons originating at the cathodes 18, 20, and 22. The scanning synchronizing signals may be separated from the rest of the composite signal by a sync separator 24 and applied to a field scanning system 26 that drives the field deflection coils 28. The synchronizing signals are also applied to a line scanning system 30 that drives line deflection coils 32. Each of the three electron beams, therefore, scans a raster on a screen 34. A focusing coil 36 maintains proper registration of the three beams of electrons so that they strike substantially the same point on the screen. Although the details are not shown, the screen 34 is constructed so that each beam strikes a phosphor that emits a different one of the selected component colors of the system.

The grid 14 controls the intensity of all three beams in accordance with the brightness information in the video signal. For reasons that need not be explained in full, the color carrier, although occupying the same portion of the video spectrum as the high frequencies of the brightness signal has no substantial effect on the average brightness. If all the beams have the same intensity, the image formed on the screen 34 may be comprised of various shades of gray and exhibit no color. This is the desired condition when no color information is televised.

The reproduction of color is effected in the following way. The color carrier and portions of its sidebands are selected from the video signal by a band pass filter 35 and applied to a synchronous detector 37 wherein it is heterodyned with each of a plurality of phases of a reference wave that is derived in a manner to be described and applied to the synchronous detector via a lead 41. It is not necessary for an understanding of the present invention to go into the operation of the various types of synchronous detectors that may be used. Suffice it to say, however, that color representative signals appear at three different outputs of the detector and are separately applied to one of the cathodes 18, 20 or 22.

At some point in the circuit of the video amplifier 12 a composite video signal such as illustrated by a graph 38 is available. In order to isolate the bursts 40 that are shown as occuring during the portion of the line blanking interval following each line synchronizing pulse, it has been previously suggested that the composite signal be applied to a normally closed gate circuit 42 and that means be provided for rendering the gate circuit capable of passing signals only during the burst interval. Various means may be used but in the illustrated arrangement, the flyback pulses appearing across the line deflection coil 32 during the burst interval are applied to open the gate 42 and permit a burst such as illustrated by a graph 44 to appear at the output of the gate.

In accordance with the present invention these bursts of a few cycles of a reference phase of the color carrier are applied to means for deriving a substantially continuous reference wave. It has previously been stated that this means be such as to have a low output amplitude level when the bursts are not present. Although various means may occur to one skilled in the art, a piezo-electric crystal 46 that is preferably cut to pass only a narrow region of frequencies centered at the fundamental frequency of the bursts 44 has been shown. As the bursts occur at the line repetition frequency, the principal sidebands of the fundamental frequency are spaced therefrom by a number of cycles equal to the line repetition frequency. The region of frequencies selected by the crystal should exclude these sidebands. The reference wave at the output of the crystal 46 is developed across a series connected load resistor 48. Owing to the decay in the oscillations of the crystal 46 during the line scanning intervals between the bursts, the reference wave at this point appears as indicated by the graph 50. It will be appreciated by those skilled in the art that when the bursts are not present, noise pulses may pass through the gate 42 and energize the crystal 46. However, the amount of energy in such a noise pulse at the fundamental frequency of the crystal is generally so low that the average energy of any resulting oscillations appearing across the resistor 48 is much less than the energy of even the smallest oscillation of the wave 50 that is produced in response to the recurrent bursts.

The output of the crystal may be amplified, if desired, by an amplifier 52 before it is applied to a squelch circuit 54. The squelch circuit is one means for passing only those signals that exceed a predetermined energy level. In accordance with one of the principles of this invention, this predetermined level is set just above that attained by signals produced by the crystal in response to noise. Therefore, when no bursts are present or when they are extremely weak, no reference wave appears at the output of the squelch circuit 54. The output of the squelch circuit may be applied directly to the conductor 41 and hence to the synchronous detector 37. However, the reference wave still has amplitude variations as illustrated by the graph 50, that may prevent the optimum operation of the synchronous detector 37. Therefore, in accordance with another principle of this invention, a limiter 56 may be inserted between the squelch circuit and the synchronous detector.

Although well-known squelch circuits and limiters may be used, a novel circuit is illustrated in Figure 2 that performs both of these functions in a highly satisfactory manner. The output of the crystal 46 is coupled between input terminals 60 and 62, the latter being established at a reference potential, here shown as ground. The terminal 60 is coupled via a suitable coupling condenser 64 to a control grid 66 of an electron discharge device 68. A grid leak resistor 70 is coupled between the control grid 66 and the cathode 72 of the device 68. A cathode biasing resistor 74 and a condenser 76 are connected in parallel between the cathode 72 and the grounded input terminal 62. A source 80 of fixed potential having positive and negative terminals is coupled between ground and a grid 82 so as to make the latter positive. An output load impedance, here shown as a parallel resonant circuit 84, is coupled between the positive terminal of the source 80 and the plate 87 of the electron discharge device 68. If the squelch limiter is to be used in connection with the color receiver of Figure 1, the plate 87 is coupled to the synchronous detector 37. Instead of connecting a grid 88 to the cathode as is customary, the grid 88 is connected to ground. The electron discharge device 68 is, therefore, illustrated as being a pentode having a control grid 66, a screen grid 82 and a suppressor grid 88.

The operation of the squelch-limiting circuit of Figure 2 is as follows. Under no signal condition, the positive voltage applied to the screen grid 82 causes screen current to flow through resistance 74, thereby causing the cathode 72 to be sufficiently positive with respect to ground and hence with respect to the suppressor grid 88 that no plate current can flow. When a signal is applied between the terminals 60 and 62, grid rectification takes place and the grid 66 is biased negatively with respect to the cathode 72. As a result, the current drawn by the screen grid 82 is decreased and the cathode is made less positive. Consequently, when the applied signal has sufficient energy, the cathode potential, although still positive, is sufficiently low to pass the critical voltage at which the suppressor grid 88 can prevent the flow of plate current. Once plate current begins to flow, limiting action commences. The greater the energy of the applied signal, the more negative is the grid and the lower is the gain of the electron discharge device. These factors combine within reasonable limits to produce a signal of a substantially constant amplitude for wide variations in the amplitude of the applied signal. In this way the variations in amplitude of the crystal output wave 50 are smoothed out.

While the invention has been described in particular reference to its use in a color television receiver, the squelch-limiter of Figure 2 can also be used in other types of receiver circuits wherever these functions are required. For example, it may be employed between the intermediate frequency amplifier of a frequency modulation receiver and the sound discriminator.

The circuit of Figure 2 operates in the following manner to prevent noise impulses from reaching the output of the tube 68 when no signals are received. In this situation, the screen grid 82 draws sufficient current through the cathode resistor 74 to cause the suppressor grid 88 to cut off the flow of plate current as previously explained. If an impulse of noise reaches the tuned circuits (not shown) that usually precede the squelch limiter, voltage oscillations such as indicated by the curve 86 appear between the terminals 60 and 62. During the oscillations 86, the average potential on the control grid 66 is reduced for reasons well-known to those skilled in the art. Thus the average current flowing to the screen grid 82 is reduced. If it were not for